United States Patent [19]

Nakagawa et al.

[11] Patent Number: 4,701,755
[45] Date of Patent: Oct. 20, 1987

[54] DATA SWITCHING SYSTEM

[75] Inventors: Masatsugu Nakagawa; Tatsuya Iwano, both of Tokyo, Japan

[73] Assignee: NEC Corporation, Tokyo, Japan

[21] Appl. No.: 731,352

[22] Filed: May 7, 1985

[30] Foreign Application Priority Data

May 11, 1984 [JP] Japan .................................. 59-94027

[51] Int. Cl.$^4$ .............................................. H04Q 9/00
[52] U.S. Cl. .............................. 340/825.02; 340/825.5; 370/85
[58] Field of Search ...................... 340/825.02, 825.05, 340/825.5, 825.79; 370/88, 85, 16, 54; 455/3, 14

[56] References Cited

U.S. PATENT DOCUMENTS

| | | | |
|---|---|---|---|
| 4,063,220 | 12/1977 | Metcalfe et al. | 340/825.5 |
| 4,340,776 | 7/1982 | Ganz et al. | 370/88 |
| 4,441,162 | 4/1984 | Lillie | 370/85 |
| 4,488,151 | 12/1984 | Bolton et al. | 370/85 |
| 4,596,982 | 6/1986 | Bahr et al. | 340/825.06 |
| 4,597,078 | 6/1986 | Kempf | 370/85 |

OTHER PUBLICATIONS

NEC Electronics U.S.A., Inc., Microcomputer Division, 1982 Catalog, pp. 47-53; 435-447; 607-617; 631-649; 675-693.

Primary Examiner—Donald J. Yusko
Attorney, Agent, or Firm—Schwartz, Jeffery, Schwaab, Mack, Blumenthal & Evans

[57] ABSTRACT

A data switching system for processing large-capacity traffic employs a plurality of horizontal and vertical buses arranged in a logical lattice-like array having crosspoints at the intersection thereof. A plurality of data communication modules are connected at the crosspoints of the horizontal and vertical buses of the lattice-like array. The communication modules are connected to a plurality of data lines for controlling communications between the data lines and the horizontal and vertical buses, between the horizontal buses and the vertical buses and between the data lines themselves.

2 Claims, 5 Drawing Figures

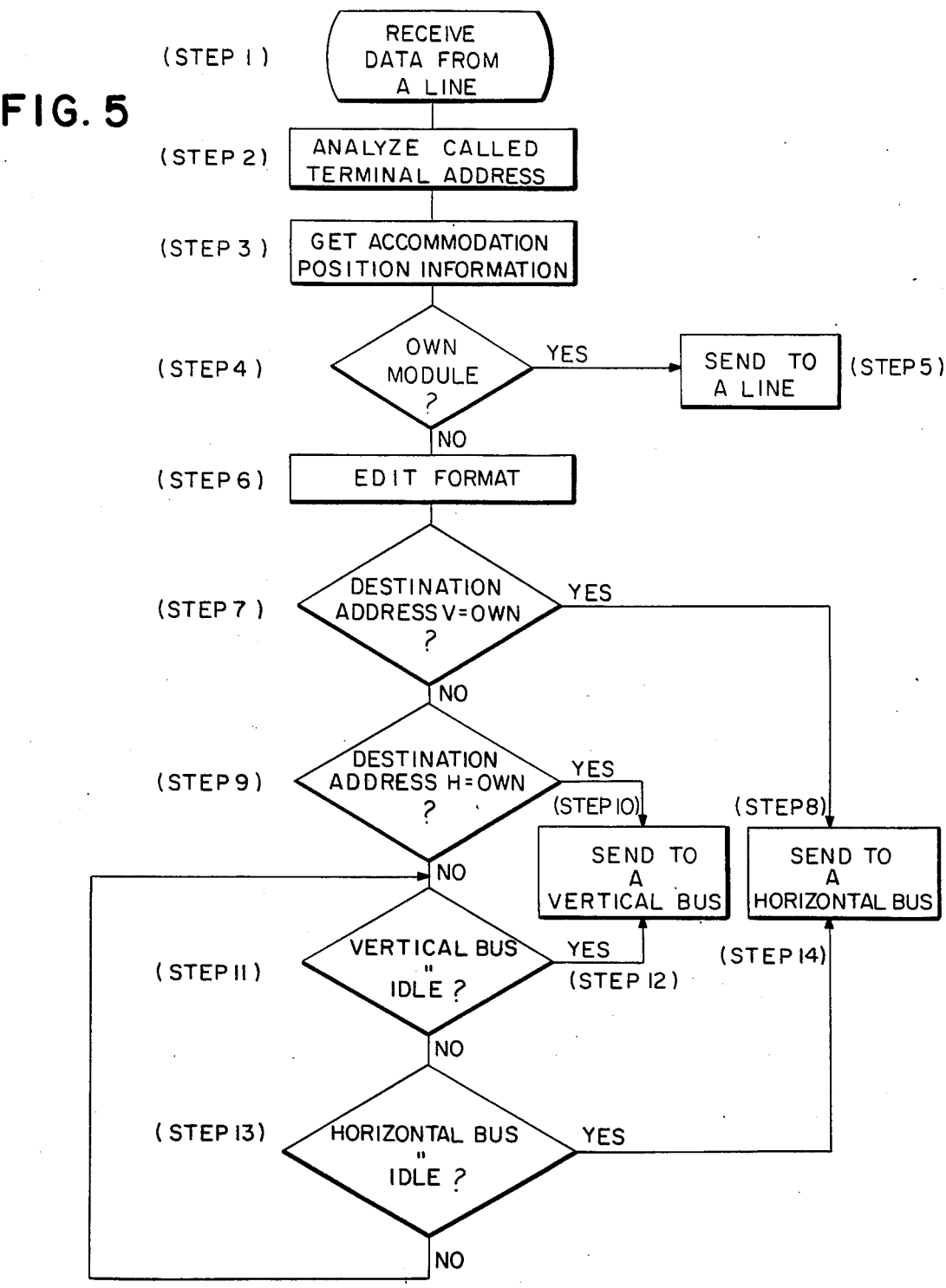

DATA SWITCHING SYSTEM

BACKGROUND OF THE INVENTION

1. Field of the Invention

The present invention relates to a data switching system having a plurality of data communication modules and applicable to the large-capacity data switching operation or the like.

2. Description of the Prior Art

In recent years there has been developed a private communication network for interconnecting various types of device such as computers, data terminals, personal computers, work stations, etc. These devices are distributed within a relatively limited area such as the same premises, the same building or the like. One example of such a network is proposed in U.S. Pat. No. 4,063,220 issued to Metcalfe et al. This network is composed of a single coaxial cable serving as a transmission path and a plurality of nodes, each of which has a transceiver and a controller. Since the transmission path is used in common, the transmission and reception of data can be achieved at every station connected thereto. The transmission speed in the network is generally as high as several 10 kilobits/second to 100 megabits/second which is far faster than that in a public communication network. Further, since each node can control the communication function of the network, the entire system cost is proportional to the number of the nodes. The respective nodes are of a passive type which do not necessitate the regeneration nor repeat of signals, because the system is constructed so that the signals are generally transmitted on the bus in both directions and an addressed node identifies only the signal addressed to itself during the period before the signal arrives at terminators located at both terminal end of the transmission path. Accordingly, even if any fault should arise at one node, the fault is confined only in that node so as not to affect other communications, so long as the node is a passive module.

Because of the use of a single transmission path in such a network, however, communication can be achieved at the same time only between two terminals. Therefore, if the bus network structure is kept intact, it is difficult to construct a large-scale switching system.

SUMMARY OF THE INVENTION

An object of the present invention is, therefore, to provide a data switching system, which can process, as a whole, large-capacity traffic by enabling every one of a plurality of data communication modules to communicate with horizontal and vertical buses having a relatively small capacity to eliminate the abovementioned disadvantages in the prior art system.

According to one aspect of the invention, there is provided a large-capacity data switching system, which comprising: transmission means including a horizontal bus group having a plurality of data transmission media and a vertical bus group having a plurality of data transmission media both bus groups being arranged logically in lattice form; and a plurality of data communication modules each of which is connected to the horizontal bus and the vertical bus at a cross point of the lattice-like array, for accommodating a plurality of data lines for controlling communication between lines accommodated therein and the vertical bus or horizontal bus, between the horizontal bus and the vertical bus or between the aforementioned lines themselves.

BRIEF DESCRIPTION OF THE DRAWINGS

The present invention will be described in conjunction with the accompanying drawing in which:

FIG. 4 is a diagramatic representation of one example of a frame format of a signal available in the present invention; and FIG. 5 is a flow chart for describing the operation of the communication module shown in FIG. 3.

In the drawings, the same reference numerals denote the same structural elements.

DESCRIPTION OF THE PREFERRED EMBODIMENT

Figure 1:
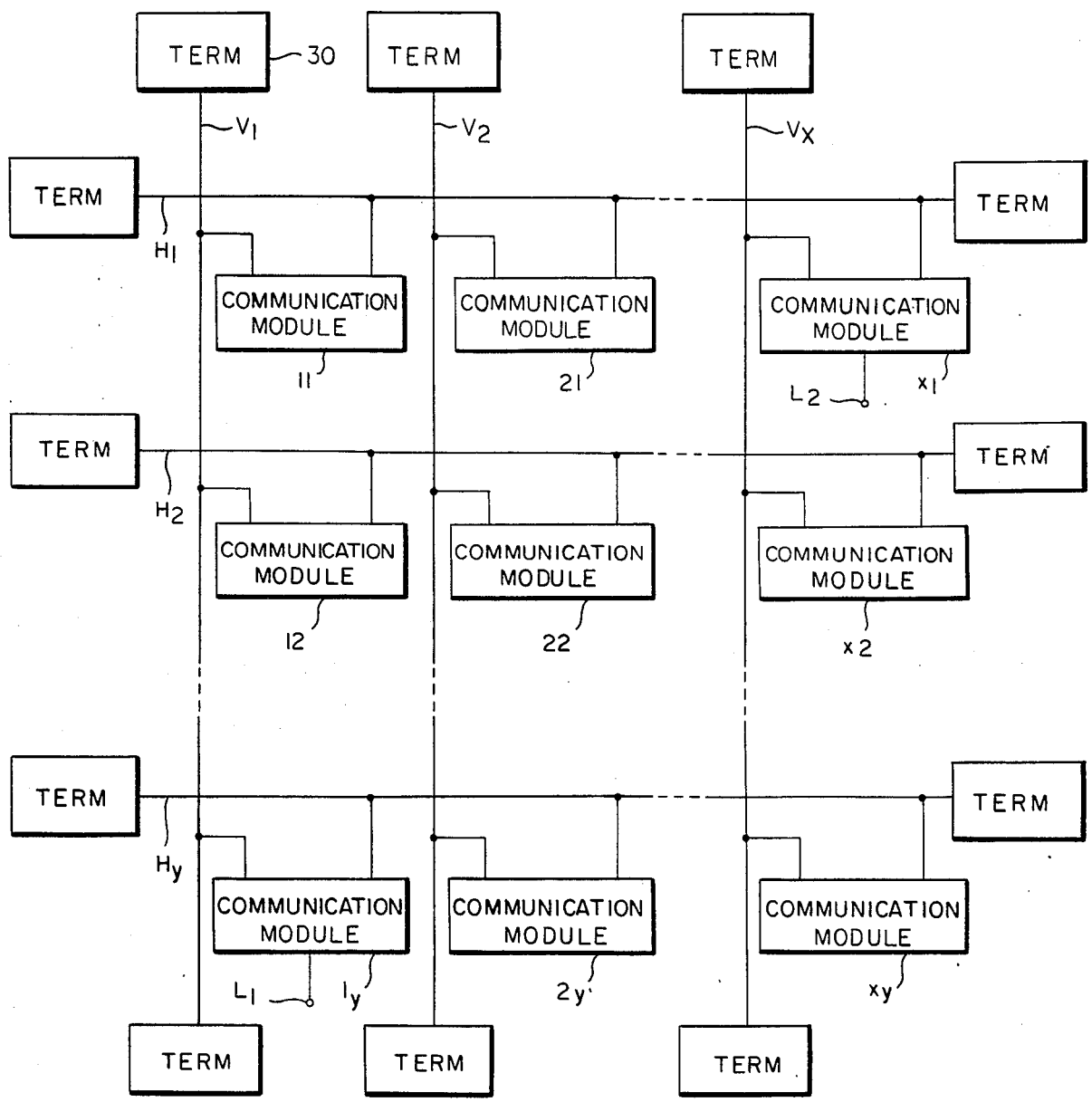
FIG. 1 is a block diagram of one embodiment of the present invention.

Referring now to FIG. 1, one embodiment of the invention comprises a plurality of vertical buses $V_1$, $V_2$, ..., and $V_x$; a plurality of horizontal buses $H_1$, $H_2$, ..., and $H_y$; data communication modules 11, 12, ..., and xy; and terminators 30 connected to the opposite ends of the respective vertical and horizontal buses. Each of the data communication modules 11, 12, ..., and xy is connected to corresponding one of the vertical buses, $V_1$, $V_2$, ..., and $V_x$ and corresponding one of the horizontal buses $H_1$, $H_2$, ..., and $H_y$ which are arrayed logically in lattice form at the corresponding lattice cross-point. The terminators 30 are conventional impedance matching devices such as resistors.

Description will be made on a data flow in the large-capacity packet switching system constructed in the above-described manner with respect to the case where communication is performed between a line $L_1$ accommodated in the data communication module $1_y$ and a line $L_2$ accommodated in the data communication module $x_1$. Data transmitted from the line $L_1$, which is accommodated in the data communication module $1_y$, is inputted to the module 11 via the vertical bus $V_1$. The module 11 determines that the data is in transit, and outputs the data to the horizontal bus $H_1$. Thereafter, the data is inputted to the data communication module x1 through the horizontal bus $H_1$, thereby transmitting the data transmitted from the line $L_1$ to the line $L_2$ accommodated in the module x1.

It is to be noted that while the data communication modules relating to the communication were three modules, that is, originating, terminating and transit modules, the transit module is unnecessary in the case where origination and termination are effected between lines accommodated in the same data communication module or in the case where the originating and terminating data communication modules are connected to a single vertical or single horizontal bus. In addition, in the event that a data communication module at a certain lattice cross-point is not available due to a fault or overflow of traffic, then communication can be performed through another data communication module connected to horizontal and vertical buses different from the vertical horizontal buses to which the unavailable data communication module is connected.

Figure 2:
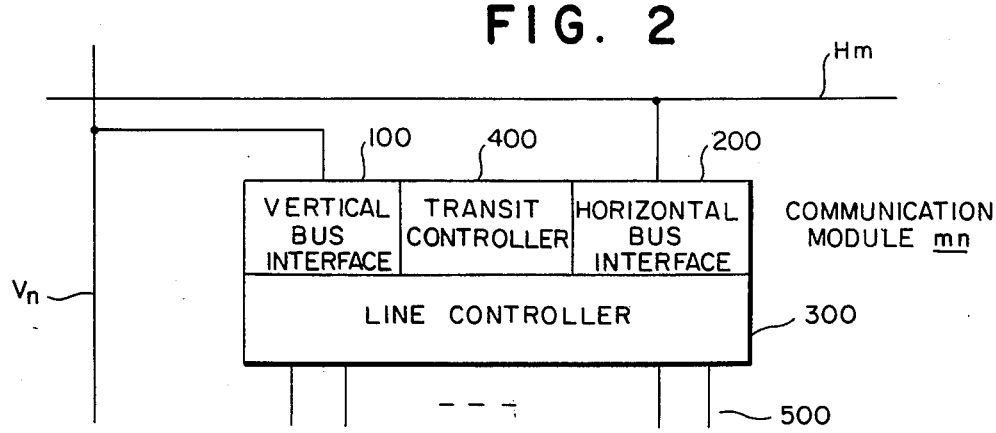
FIG. 2 is a block diagram of a basic structure of a communication module shown in FIG. 1.

Referring to FIG. 2, every data communication module mm ($m=1-x$, $n=1-y$) comprises a vertical bus interface 100 connected to a vertical bus $V_n$, a horizontal bus interface 200 connected to a horizontal bus $H_m$, a line controller 300 accommodating lines 500, and a transit controller 400 for processing traffic between a vertical bus V and a horizontal bus H, between respective lines and between a line and a bus.

Now the basic structure of the data communication module shown in FIG. 2 will be described referring to FIG. 3. The interfaces 100 and 200 perform control for data transmission and reception to and from the vertical bus V and the horizontal bus H, respectively, according to a carrier sense multiple access-collision detection (CSMA/CD) technique. Since the principal constructions of the vertical bus interface 100 and the horizontal bus interface 200 and the control methods thereof are disclosed in the above-mentioned U.S. Pat. No. 4,063,220, more detailed description thereof will be omitted.

The transit controller 400 includes a controller 410 for controlling direct memory access (DMA) from the interfaces 100 and 200, a central processor 420 for controlling this entire data communication module, an interrupt controller 430 for arbitrating among interruptions from the interface 100, (the interface 200, the DMA controller 410, the central processor 420, and communication interfaces 310, 320, . . . , and 3n0 as will be described later,) and a random access memory (RAM) 440.

In addition, the line controller 300 comprises a plurality of communication interfaces 310, 320, . . . , and 3n0, and these communication interfaces control interface with lines 510, 520, . . . , and 5n0 mainly with the aid of the processor 420 and the RAM 440.

All of the structural elements referred to above may be composed of the products available from NEC Corporation under the following trade names:

| Structural Elements | Trade Names |
| --- | --- |
| DMA controller 410 | μPD8237A |
| Central processor 420 | μPD8086 |
| Interrupt controller 430 | μPD8259A |
| RAM 440 | μPD2147 |
| Communication interface 310, 320, . . . , 3n0 | μPD8251A |

Details of these products are shown on pages 47–52, 435–446, 607–617, 631–648 and 675–692, respectively, of the catalog published in 1982 by NEC Electronics U.S.A., Inc.

Now one example of the frame (packet) format of the signals on the vertical bus V and the horizontal bus H used in the invention will be described with reference to FIG. 4. A preamble 610 includes a synchronizing pattern of 7 octets for the vertical bus interface 100 and the horizontal bus interface 200 to extract a clock necessitated for receiving a frame and to establish the synchronization of bits. Each of the octets is formed of "10101010". A start frame delimiter 611 is an octet representing a leading end of an effective frame, and the structure thereof is "10101011". A destination address V 612 represents an address of a module connected to the vertical bus V, and it includes 2 or 6 octets depending upon the number of modules. A destination address H 613 represents an address of a module connected to the horizontal bus H, and like the destination address V 612 it includes 2 or 6 octes depending upon the number of modules. Further, a control information 614 contains information such as the length (an integer multiple of an octet) of the data in the frame or the like, and the length of the control information is 2 to 6 octes. Moreover, data 615 are inserted into the frame packet, and finally a cyclic redundancy check (CRC) code 616 of 4 octets for detecting a bit error in the frame is given.

With regard to the operations of the above-described embodiment, description will be given with respect to the cases of mutual communication between lines accommodated in the same module, transmission from one module to another module, and reception from another module.

MUTUAL COMMUNICATION BETWEEN LINES ACCOMMODATED IN THE SAME OWN MODULE

Figure 3:
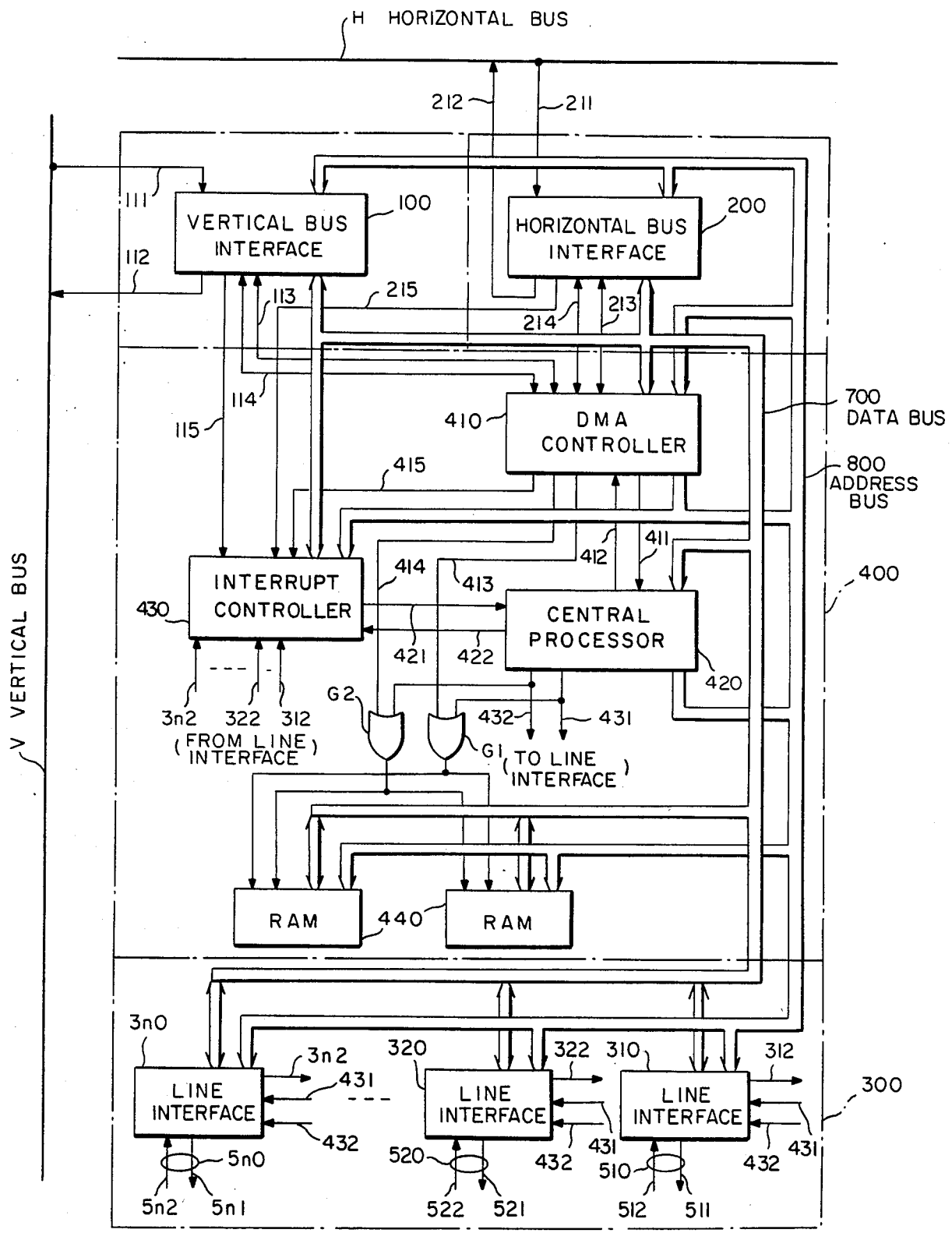
FIG. 3 is a detailed block diagram of the communication module shown in FIG. 2.

Referring now to FIG. 3 and FIG. 5, it is assumed that the communication interface 310 shown in FIG. 3, for example, has received data from a reception data line 512 of the line 510 (step 1). After the reception data in bit serial form received from the line 512 has been converted into a parallel signal, the interface 310 notifies the interrupt controller 430 via an interrupt input line 312 that data has been received (interrupt request). After the controller 430 has registered the interrupt request according to a predetermined priority level, it requests interrupt processing to the central processor 420 through an interrupt output line 421 when the predetermined priority level for that interrupt processing has been reached. The processor 420 accepts that interrupt request and sends back a interrupt acknowledgement signal through an interrupt acknowledgement input line 422, and further, it instructs the interface 310 that the received data should be delivered to the processor 420 via a data bus 700 and an address bus 800. In addition, the processor 420 instructs the RAM 440 to store therein the received data, through a data write signal line 431, and also searches for a line accommodation position on the basis of the destination address of the received data (steps 2 and 3). Subsequently, the processor 420 determines whether the accommodating position information for the called line represents a line accommodated in the own module or not (step 4), and if it is a line accommodated in the own module, it determines which one of the interfaces 320 to 3n0 corresponds to that line. At that moment, if it is determined that the corresponding one is, for example, the interface 3n0, then the interface 3n0 is activated by the processor 420. The interface 3n0 requests an interrupt through an interrupt input line 3n2 to the interrupt controller 430 to request the transmission of the data stored in the RAM 440. The controller 430 registers the interrupt request at the corresponding interrupt priority level, and when the corresponding interrupt priority level, has been reached, the controller 430 activates the address bus 800 representing the address information corresponding to the interface 3n0 and the data bus 700 for carrying the data to be transmitted. Furthermore, in response to a data write instruction signal issued from the processor 420 through the data write signal line 431, the data read out of the RAM 400, that is, the data received through the line 512 is written in the interface 3n0. The interface 3n0 then converts the data into a bit serial signal to transmit the data through a transmission data line 5n1 of the line 5n0 (step 5).

TRANSMISSION FROM THE ONE MODULE TO ANOTHER MODULE

In the above-described step 4, if the processor 420 determines that the accommodated position of the destination line is not present in the own module, then the processor 420 produces the addresses of the vertical bus V and the horizontal bus H corresponding to the destination module on the basis of the line accommodation position information, and edits the format shown in FIG. 4 by adding the address of the vertical bus V and the horizontal bus H to the data stored in the RAM 440 (step 6). Furthermore, the processor 420 determines whether or not the destination address V of the editted packet coincides with the address of the own module (step 7), and if it coincides, then another module connected to the same vertical bus V is the destination, and hence the processor 420 activates the vertical bus interface 100 to perform transmission processing. The interface 100 confirms an idle state of the vertical bus V according to the CSMA/CD technique, and if it is idle, the interface 100 occupies the vertical bus V (step 8). On the other hand, when the destination address V does not coincide with the address of the own module, the processor 420 determines whether or not the destination address H of the editted packet coincides with the address of the own module (step 9), and if it coincides, then another module connected to the same horizontal bus H is the destination, so that the processor 420 activates the horizontal bus interface 200 to perform transmission processing for the purpose of transmitting the above-described packet to the corresponding horizontal bus. The interface 200 confirms an idle state of the horizontal bus H according to the CSMA/CD technique, and if it is idle, the interface 200 occupies the horizontal bus H (step 10).

In the event that neither of the destination addresses V and H coincides with the address of the own module, then at first the processor 420 checks an idle state of the vertical bus with the aid of the interface 100 similarly to the above-described processing (step 11), and if it is idle, the interface 100 occupies the vertical bus V (step 12), but if it is not idle, an idle state of the horizontal bus H is confirmed with the aid of the horizontal bus interface 200 (step 13), and if it is idle, then the interface 200 occupies this horizontal bus H (step 14). If the horizontal bus is also not idle, the process returns again to step 11, and the operation steps are repeated until step 14. The interface 100 or 200 which has occupied the vertical bus V or the horizontal bus H converts the data read out of the RAM 400 and editted into the predetermined format into a bit serial signal and sends the converted signal to the corresponding bus. When the transmission has been completed, the vertical bus interface 100 or the horizontal bus interface 200 sends an interrupt signal to the interrupt controller 430 via an interrupt input line 115 or 215. After the controller 430 has finished arbitration among the interrupts, it notifies the processor 420 that a transmission processing has been completed.

RECEPTION FROM ANOTHER MODULE

Now description will be made on the operation of receiving a packet from a vertical bus V. Referring again to FIG. 3, after the vertical bus interface 100 has received the preamble 610 (See FIG. 4) from the vertical bus V through a vertical bus reception data line 111, when it has detected the start frame delimiter 611 (See FIG. 4), the interface 100 compares the destination address H 613 (See FIG. 4) of the received frame with the address H preset in that vertical bus interface 100, and if they coincide with each other, the vertical bus interface 100 starts reception operation.

After a predetermined timing period for detection of an address, the interface 100 outputs a demand for data bus occupation according to DMA to a vertical bus reception DMA request/confirmation signal line 113. After arbitration has been done among a plurality of DMA demands in the DMA controller 410, a demand for effecting competitive processing in the processor 420 is sent from the DMA controller 410 to that processor 420 via a DMA demand signal line 411. The processor 420 accepts the above-mentioned request of the controller 410, and sends back a signal indicating that the demand has been accepted to the controller 410 through a DMA acceptance confirmation signal line 412. In response to that signal, the controller 410 sends a signal indicating that the demand for occupation of the data bus has been verified to the interface 100 through a vertical bus reception DMA demand/confirmation signal line 113. In response to this signal, the interface 100 outputs the data received from the bus V to the data bus 700. At the same time, a write control signal for the RAM 440 sent from the controller 410 is produced from the line 413, and passed through an OR gate G1. As a result, a timing signal is fed to the RAM 440. Also, at the same time, an address of the RAM 440 where the data is to be written is given from the controller 410 onto the address bus 800, so as to store the received data in the RAM 440. Subsequently, in response to an interrupt signal representing the completion of reception that is sent from the vertical bus interrupt input line 115 of the interface 100, arbitration among the interrupts is performed in the interrupt controller 430, and an interrupt processing in the processor 420 is then started. The processor 420 entracts the address V from the packet received from the bus V and compares it with the address V of the own module. At this moment, if the respective addresses coincide with each other, then this packet is addressed to its own module, and so, a reception processing as described later is carried out. Whereas, if they do not coincide with each other, then the processor 420 determines that the packet is addressed to another module connected to the horizontal bus H to which the subject module is connected, and so, a processing for sending the data to that bus H is started.

In order to read out the received data which is stored in the RAM 440, the processor 420 sets the memory address information of the RAM 440 in to the controller 410 through the address bus 800. Also, the processor 420 activates the interface 200 to perform transmission processing. The interface 200 confirms an idle state of the bus H according to the CSMA/CD protocol, and if it is idle, the interface 200 occupies that bus H. After the occupation of the bus H, the controller 410 performs the arbitration among DMA's in response to a transmission DMA request signal sent from the horizontal bus transmission DMA demand confirmation signal line 214, and it then applies a timing signal for reading out the stored data in the RAM 440 to an input of an OR gate G2 via a memory read signal line 414. In the RAM 440, the data to be transmitted is read out by means of the above-mentioned timing signal and the memory address sent from the controller 410 through the address bus 800, and the read data is sent to the interface 200 via the data bus 700. The interface 200 converts the data into a bit serial signal to send it to the bus H via a horizontal bus data line 212. Upon completion of the transmission, the interface 200 sends an interrupt signal to the interrupt controller 430 through a horizontal bus interrupt signal line 215. After the controller 430 has performed the arbitration among interrupts, it notifies the processor 420 that the transmission processing has been completed. Through the above-mentioned operations, a transit processing is completed. It is to be noted that while the transit processing has been described above in connection to the case where transmission is effected from the vertical bus V to the horizontal bus H, transit in the reversed direction can be also achieved in a similar manner.

RECEPTION AT THE OWN MODULE DESTINATION

In the reception processing from the vertical bus V as described previously, if it is determined that the received vertical and horizontal address V and H are the destination of the own module, then the line accomodation position is sought through the processing of step 3 shown in FIG. 5 and described above. Then, the data are output to the corresponding line through the processing of step 5.

It is to be noted that in the case of the illustrated embodiment, if the respective data communication modules have a capability of 100 kilobits/second, the traffic on each bus is about 0.4~0.45 megabits/second, but according to our calculation, the switching equipment as a whole can achieve processing of a traffic of 3.6 megabits/second. This traffic value is proportional to the number of the horizontal or vertical buses. For example, by employing 100 communication media each having a capacity of 1 megabits/second for the horizontal buses and the vertical buses, respectively, it is possible to achieve switching of a traffic of 100 megabits/second as a whole, but the traffic for each data communication module in this case, can be designed to be as small as 100 kilobits/second.

What is claimed is:

1. A data switching system comprising:
   transmission means including a plurality of horizontal buses and a plurality of vertical buses, both buses being arrayed logically in a lattice form; and
   a plurality of data communication modules, each of which is connected to one of said horizontal buses and one of said vertical buses at a cross point of said lattice-like array, for accommodating a plurality of data lines for controlling communications between said data lines and said horizontal or vertical bus, between said horizontal bus and said vertical bus and between said data lines themselves, wherein each data communication module includes:
   a vertical bus interface for interfacing with a corresponding vertical bus;
   a horizontal bus interface for interfacing with a corresponding horizontal bus;
   a line controller having a plurality of communication interfaces for accommodating said data lines; and
   a transit controller having a controller for controlling direct memory access from said vertical bus and said horizontal bus, a central processor for controlling this entire data communication module, and an interrupt controller for arbitrating among interruptions from said vertical bus interface, said horizontal bus interface, said controller, said central processor and said line control controller.

2. A data switching system according to claim 1, wherein each data communication module further includes at least one memory connected to said direct memory access controller for storing data transmitted on said data lines.

* * * * *